April 7, 1964
R. J. PAGLIUSO
3,127,696
MODEL HELICOPTER
Filed June 5, 1961
2 Sheets-Sheet 2
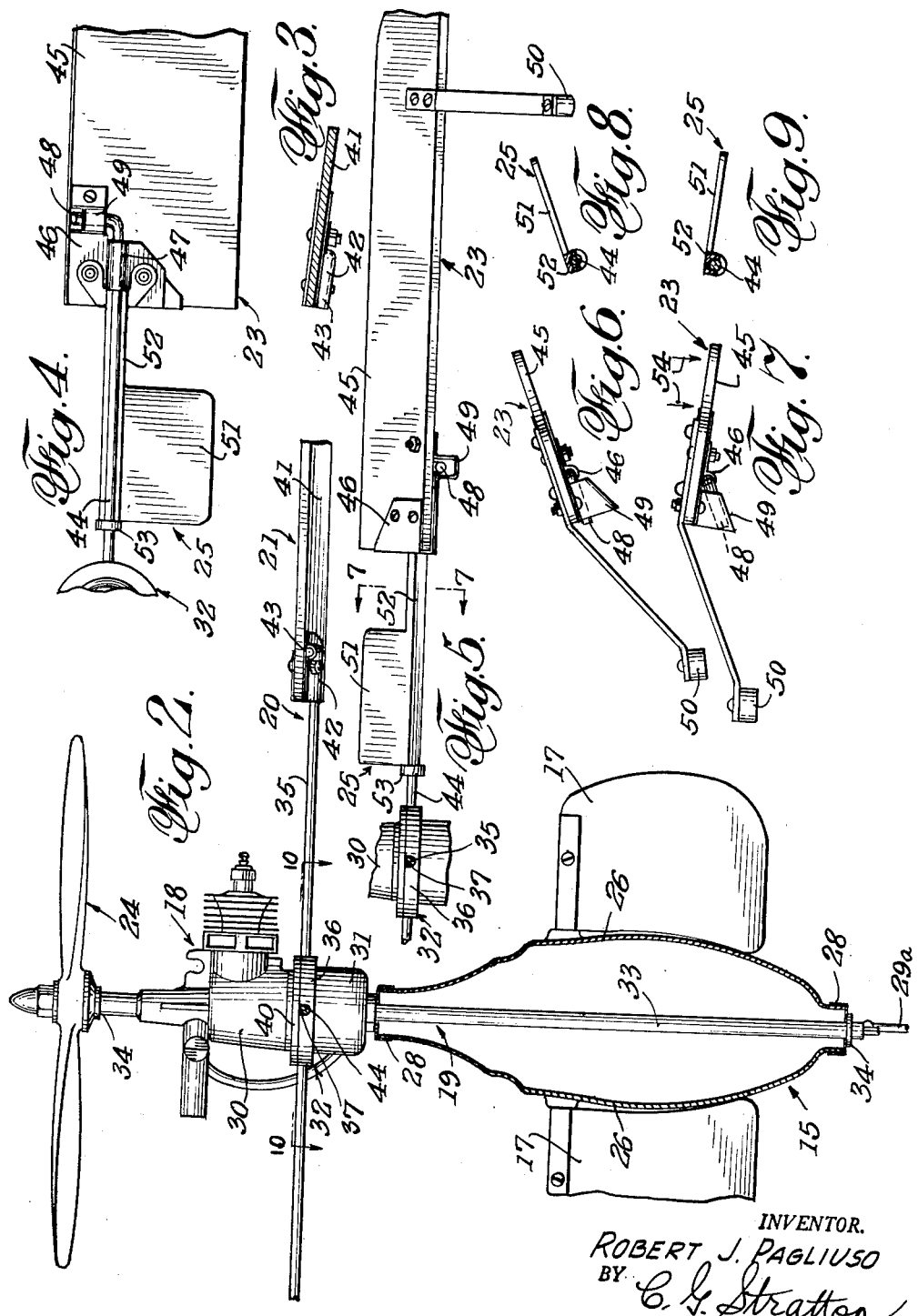
INVENTOR.
ROBERT J. PAGLIUSO
BY C. G. Stratton
ATTORNEY

United States Patent Office 3,127,696
Patented Apr. 7, 1964

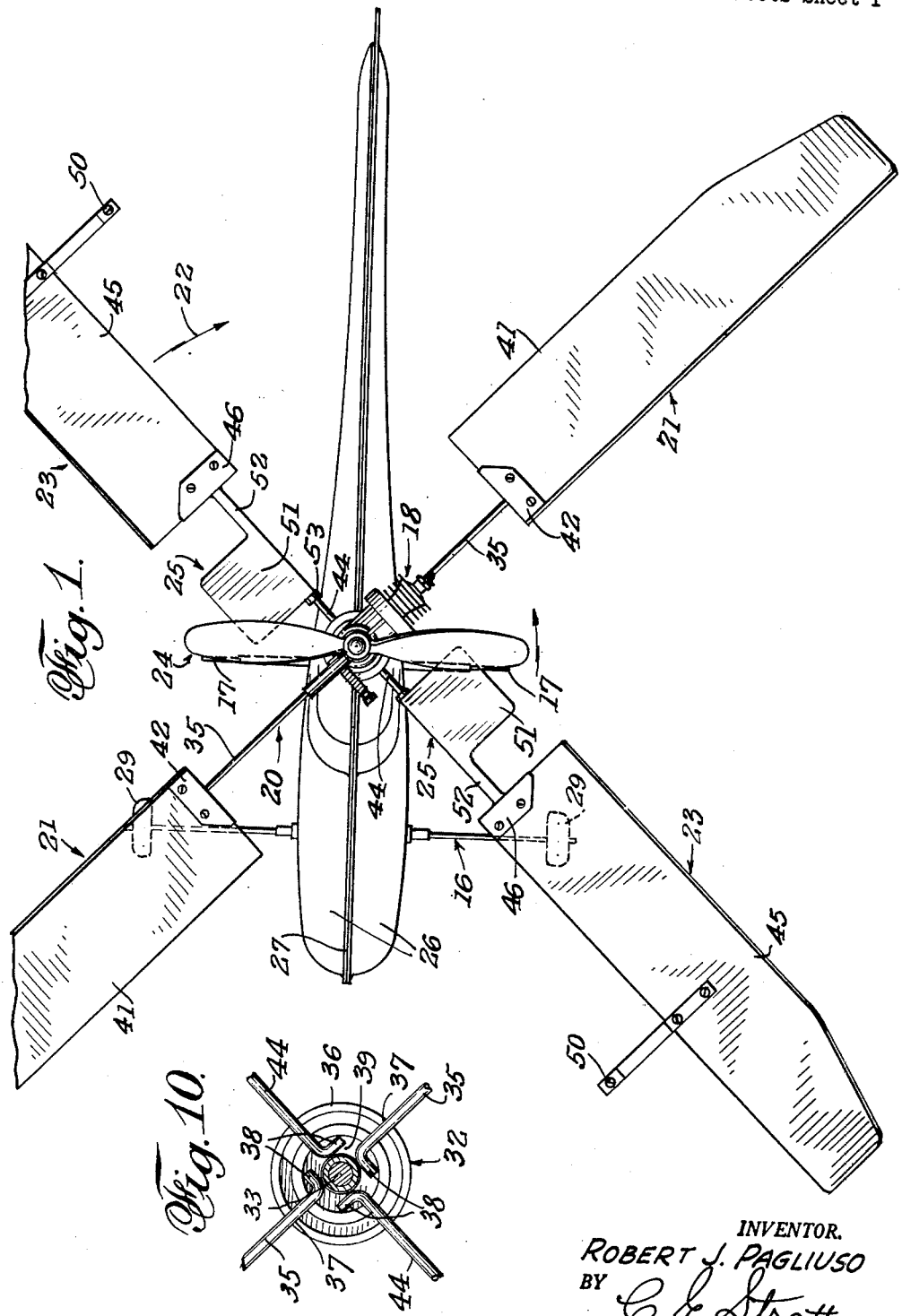

3,127,696
MODEL HELICOPTER
Robert J. Pagliuso, La Canada, Calif.
(113 W. Harvard St., Glendale, Calif.)
Filed June 5, 1961, Ser. No. 114,952
8 Claims. (Cl. 46—75)

This invention relates to a model helicopter, i.e., a helicopter of small size, yet one that is power-driven and will soar until its fuel is exhausted.

An object of the invention is to provide a model helicopter that has stability under powered flight and will retain stability during descent when the fuel is exhausted and the wings or rotors are turning freely.

Another object of the invention is to provide a model helicopter in which two of its four revolving wings automatically shift from an angle of attack that provides for efficient rise of the vehicle under power to an angle of attack that cooperates with the other two wings and provides for efficient, stabile descent of the vehicle after the fuel powering its engine has become exhausted.

A further object of the invention is to provide a helicopter that utilizes the slip stream of a high-speed propeller on a vertical axis to automatically shift the two shiftable wings to vehicle-raising position.

This invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description and which is based on the accompanying drawings. However, said drawings merely show, and the following description merely describes, one embodiment of the present invention, which is given by way of illustration or example only.

In the drawings, like reference characters designate similar parts in the several views.

FIG. 1 is a plan view, with two of the wings of the rotor partly broken away, of a model helicopter according to the present invention.

FIG. 2 is an enlarged and broken vertical sectional view taken on the axis of rotation of the rotor of said helicopter.

FIG. 3 is a cross-sectional view of one of the fixed wings of the rotor of the helicopter.

FIG. 4 is a broken bottom plan view of one of the shiftable wings of the rotor.

FIG. 5 is an edge view thereof, as seen from the leading edge.

FIG. 6 is an end view of one of the shiftable rotor wings in the unshifted, or normal position.

FIG. 7 is a similar view of said wing in its shifted position, as during vertical ascent of the helicopter.

FIGS. 8 and 9 are cross-sectional views, in positions respectively corresponding to FIGS. 6 and 7, of wing shifting means, the same being taken on the line 8—8 of FIG. 5.

FIG. 10 is a broken cross-sectional view as taken on the line 10—10 of FIG. 2.

The present model helicopter comprises, generally, a lightweight body 15 having suitable landing gear 16 and provided with fixed fins 17 to counteract body-turning tendencies, an engine 18 mounted on said body 15, means 19 connecting the engine to the body so that the former freely rotates on and relatively to the body in one direction, a rotor 20 affixed to and rotating with the engine and comprising two diametrally aligned wings 21 having fixed angles of attack in a clockwise direction, as suggested by the arrow 22, and further comprising two shiftable wings 23, a propeller 24 driven by the engine 18 at a high rate of speed and in the opposite direction to the rotation of the rotor 20 and providing a slip stream in a downward direction, and means 25 subject to said slip stream and connected to the shiftable wings to shift the latter from normal to flying position, as above suggested, under power created by the downwardly directed slip stream of said propeller.

The body or fuselage 15 is shown as a two-part housing formed of shells 26 of high-impact styrene. The form of the body may vary and is here shown as having the shells thereof held together along a seam 27 by means of upper and lower ferrules 28. The landing gear 16 is shown as resiliently mounted wheels 29 at the front of the fuselage and a trailing skid 29a (FIG. 2) at the rear, said wheels and skid providing a three-point landing gear having good, resilient stability. The fins 17 extend laterally from the sides of the fuselage slightly forward of the engine mount.

The engine 18, per se, forms no part of the present invention and is here typically shown as having a body part 30, a fuel tank 31 axially aligned with said body part, a rotor holder 32, an elongated mounting shaft 33 extending downwardly from the engine and driven in one direction, and a propeller shaft 34 extending upwardly from the engine and driven in the opposite direction to drive the propeller 24 in a reverse direction to the engine 18 and, therefore, the rotor 20.

The means 19 comprises the mentioned shaft 33 which extends through both ferrules 28, and a retainer ring 34 on the end of shaft 33 that extends through the lower ferrule. As shown in FIG. 2, the engine, by the means 19, is firmly mounted on and rotational relative to the body 15 which is stabilized by the fins 17 as the engine is rotated.

The fixed wings 21 of the rotor 20 are fixedly carried by wires 35 that extend radially from a flange 36 formed as part of the engine 18 between the body 30 and the fuel tank 31. Radial notches 37 in said flange house one end of each wire 35 which are each provided with a bend 38 in flatwise engagement with the bottom wall 39 of said flange. A cover washer 40 confines said wires in their notches, thereby holding the wires firmly yet non-rotationally on the engine. Light wing blades 41 are affixed to the outer ends of the wires 35 by means of fittings 42, offset bends 43 on the outer ends of wires 35 being clamped by said fittings to hold said wing blades at a fixed angle of attack, substantially as shown.

The shiftable wings 23 are carried by wires 44 that are similar to wires 35 and extend normal thereto from the engine 18. Wires 44 have the bends 38 and are affixed to flange 36 in the same way as wires 35. Light wing blades 45 on wires 44 are provided with fittings 46 having bearings 47 that rotationally engage said wires so that the end bends 48 of said wires are adapted to move within the confines of housing parts 49 formed in said fittings. As seen from FIG. 6, a weight 50 on the leading edge of each wing blade 45 normally depresses said edge so that the attack angle is a negative one. In practice the bends 48 are so angularly disposed that the blades 45 have a negative attack angle substantially larger than the positive attack angle of the fixed blades 41. A comparison of FIGS. 3 and 6 shows this difference in angles.

The propeller 24 is generally typical of screw propellers as used on aircraft, the blades thereof being of such extent as to create a downwardly directed slip stream covering a considerable area around the center of the engine 18.

The means 25 is here shown as a blade 51 that, by means of an extension 52, is affixed to each wing blade 45.

FIG. 4 shows such a connection in exemplary form. By providing a bearing ring 53 at the inner end of each means 25 and through which the wires 44 extend, said means is free to pivot around the axes of the wires 44 under force of the slip stream from propeller 24, as suggested by the arrows 54 in FIG. 7. Such pivotal movement shifts the wing blades 45 from the negative angle of FIG. 6 to the positive angle of attack of FIG. 7—the same as the angle of the fixed rotor blades 41.

It will be evident that starting of the engine 18 sets the rotor 20 in motion and high speed counter rotation of the propeller 24. Since all four wing blades 41 and 45 will then be at their proper attack angle to cause rise of the helicopter, the same will rise and will remain aloft until the fuel supply is used up. Upon the resultant stopping of engine operation, the propeller 24 comes to rest but the rotor 20 is subject to aerodynamic forces as the helicopter starts its descent and continues to rotate but the tilting blades assume a negative angle at the greater pitch, as described, causing the rotor to continue rotation. The return of the wing blades 45 to the negative attack angle, as caused by the weights 50, as descent begins, counter-balances with the fixed angle of the blades 41 to control descent, and particularly to accelerate rotor motion due to the negative angle of the tilting blades. Such descent accelerates the rotor and, therefore, exerts lift pressure on the under faces of the wing blades 41.

While the foregoing has illustrated and described what is now contemplated to be the best mode of carrying out the invention, the construction is, of course, subject to modification without departing from the spirit and scope of the invention. Therefore, it is not desired to restrict the invention to the particular form of construction illustrated and described, but to cover all modifications that may fall within the scope of the appended claims.

Having thus described this invention, what is claimed and desired to be secured by Letters Patent is:

1. In a model helicopter, a rotationally mounted engine, a rotor affixed to and rotational with the engine and having wing blades normally disposed at a negative angle of attack, a propeller driven by the engine to rotate independently of the rotor and disposed to produce a downwardly directed slip stream, and means fixed to the mentioned wing blades disposed in said slip stream and subject to the pressure of said slip stream to shift the blades to a positive angle of attack.

2. In a model helicopter according to claim 1 in which the propeller is disposed on a vertical axis above the rotor wings, and the means subject to the pressure of said stream are vanes affixed to the wing blades.

3. In a model helicopter according to claim 2 in which the rotor includes non-shiftable wing blades arranged alternately with the shiftable blades.

4. In a model helicopter, the element of a rotor wing which comprises: a fixed mounting wire having one end adapted for attachment to a central member and having its other end bent; a fitting connected to said wire and capable of pivotal movement with respect thereto, a portion of the fitting engaging the bent end of the wire to limit the pivotal movement thereof; a wing blade rigidly attached to said fitting; and a weight affixed to said wing blade intermediate its ends and generally on the forward edge of the blade to bias the same in a direction on its pivot to present the forward edge of the blade at a negative angle of attack, aerodynamically.

5. In a model helicopter according to claim 4, a vane affixed to the wing blade in end-spaced relation thereto, and means to create a stream of air to act on the vane to pivotally move the wing blade from its normal negative angle of attack to a positive angle.

6. A model helicopter comprising a fuselage, an engine rotationally mounter on the fuselage and extending upwardly therefrom with an elongated shaft extending vertically through the fuselage, a blade-provided rotor affixed to and rotational with the engine, a propeller driven by the engine independently of the rotor and disposed above the rotor, means mounting some of the rotor blades to pivot, and means on the latter blades in and responsive to the slip stream of the propeller to pivotally move said latter blades between one angle of attack to another angle.

7. A model helicopter according to claim 6 in which the rotor blades are provided with mounting wires and means provided on the engine to connect said wires to hold the same radially outward from the axis of rotation of the engine.

8. A model helicopter according to claim 7 in which the ends of the wires directed toward the engine axis are bent, the engine being provided with means to clamp and house said bent wire ends.

References Cited in the file of this patent

UNITED STATES PATENTS

| | | |
|---|---|---|
| 1,800,470 | Oehmichen | Apr. 14, 1931 |
| 2,035,531 | Butcher | Mar. 31, 1936 |
| 2,308,916 | Halligan et al. | Jan. 19, 1943 |
| 2,614,637 | Landgraf | Oct. 21, 1952 |
| 2,931,132 | Griessl | Apr. 5, 1960 |
| 2,949,693 | McRoskey | Aug. 23, 1960 |